Figure 1:
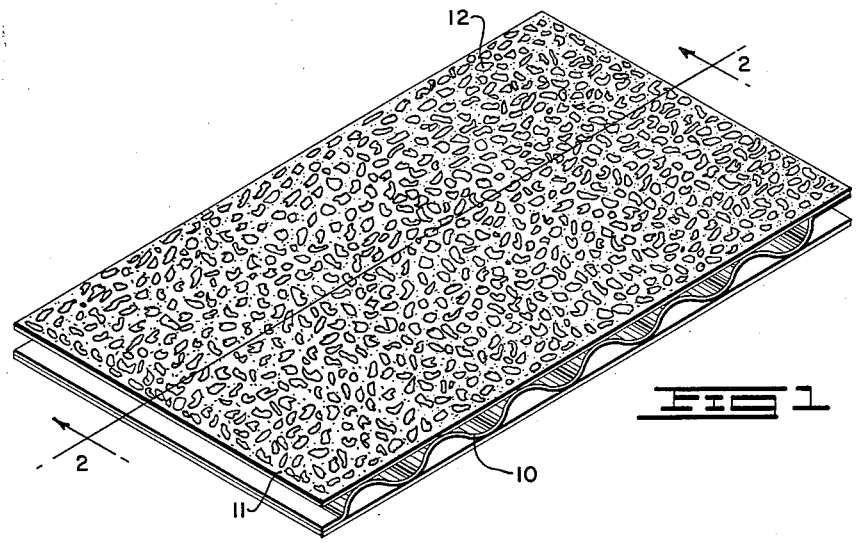

Oct. 1, 1963  K. P. LINK  3,105,321
ANTI-MOUSE BOARD
Filed Sept. 26, 1960

INVENTOR
KARL PAUL LINK

BY *Adams, Forward & McLean*

ATTORNEY

United States Patent Office 3,105,321
Patented Oct. 1, 1963

3,105,321
ANTI-MOUSE BOARD
Karl Paul Link, Middleton, Wis., assignor to Wisconsin Alumni Research Foundation, Madison, Wis., a corporation of Wisconsin
Filed Sept. 26, 1960, Ser. No. 58,320
3 Claims. (Cl. 43—131)

The present invention relates to an improved article of manufacture for use in the rodenticide field and in particular a product for destroying the common house mice (*Mus musculus brevirostris* and *Mus musculus domesticus*).

The rodent problem has been recognized as serious for many years. See Karl Paul Link Patent 2,687,365 with its reference to the U.S. Government estimates of the rodents' annual board bill, etc. See also Eadie, W. Robert, "Animal Control," The Macmillan Company, New York (1954); Link, Karl P. and Ross, Ward, Pest Control, August (1956); Pest Control, "Check up on House Mouse Control," August (1960). Also see Ross, Ward and Flynn, C., Sanitary Maintenance, April (1960). Mice in particular have posed a special problem due to their unusual habits including eating habits. Mice, for example, set up housekeeping (i.e. establish their homes or nests), near or in a satisfactory supply of food and, unlike rats, do not travel far from their nests in search of food. Baits should therefore be available in each nesting area, and it is for this reason that multiple bait stations are required for mouse infestations. Mice also like to gnaw or nibble and, unlike rats, chew or "pick at" their food with very little intake at any one time. They are truly nibblers, feeding anywhere from 18 to 25 times in 24 hours. In view of this, and as their nests are located in or near an adequate source of food to their liking, e.g. near food in the pantry, grocery stores, food storage warehouses, cold storage plants and even in offices, libraries and archives where they chew book bindings, mice ordinarily will not consume a lethal amount of a rodenticide bait unless it is in the "pièce de résistance" class. While warfarinized cereal meals and warfarinized cracked grain baits have performed well in the control of rats and mice, the search for improved bait forms attractive to the mouse and which automatically provide the user with the multiple bait stations required for mouse control, has been actively pursued by investigators working in the anticoagulant rodenticide art since warfarin was put on the market in 1950.

My investigations in this field were directed to (1) the finding of a bait form that would be attractive to mice and capable of effectively destroying mice under the conditions noted above, and (2) the finding of a bait form that would appeal to users, be they pest control operators or housewives. The latter is important for customer resistance to messy or inconvenient-to-use baits is high, and such baits are frequently not employed effectively or efficiently to rid the premises of mice.

The principal purpose or object of the present invention is to improve the art of exterminating and controlling mice in homes, food establishments, commercial food storage and distribution premises, granaries, seed storage rooms and the like.

Another object of the invention is to provide the art with a package containing a number of anti-mouse bait units which automatically provide for the setting up of effective multiple bait stations rapidly and with minimum effort.

Another object of the invention is to provide the art with a neat, clean, effective and easy to use anti-mouse product.

Another object is to provide a variety of food, including edible glue and several kinds of grain, thus catering to the whimsical taste preferences of mice.

Another object is to provide a relatively large feeding surface to accommodate several mice feeding simultaneously.

Still another object is to provide for the food material a backing which appeals to the gnawing and destructive habits of the mouse, thereby substantially reducing goods damage while the infestation is being diminished.

Other objects will be apparent as the description proceeds.

The improved rodenticide product of the present invention which meets the two stated requirements—attraction to mice and appeal to the user—comprises essentially a backing or board provided with a layer of edible glue having distributed and affixed thereon edible grain, at least one of said edible products containing an anticoagulant rodenticide. The anticoagulant rodenticide can be used with the glue, e.g. dispersed or dissolved in the glue, or sprayed on the glue, or be used with the grain, e.g. be sprayed on the grain, or be used with both the glue and the grain.

The anticoagulant rodenticide of choice is warfarin (3-($\alpha$-acetonylbenzyl)-4-hydroxycoumarin) and preferably its water-soluble derivative, warfarin sodium. In addition to its outstanding rodenticidal activity, warfarin and its derivatives, e.g. warfarin sodium, warfarin potassium, etc., also act as biological stabilizers in that they prevent or retard biological spoilage of the glue and grain. This can be important as moldy or spoiled bait is not attractive to the mouse. Other anticoagulant rodenticides, however, can be used including Marcumar (3-($\alpha$-ethylbenzyl) - 4 - hydroxycoumarin); Coumachlor (3-($\alpha$-acetonyl-4-chlorobenzyl)-4-hydroxycoumarin); Fumarin (3-($\alpha$-acetonylfurfuryl)-4-hydroxycoumarin); Pival (2-pivalyl-1,3-indandione); PMP (calcium salt of 2-isovaleryl-1,3-indandione); Diphacinone (2-diphenyl-acetyl-1,3-indandione) and the like. These rodenticide chemicals are blood anticoagulants and their action is unlike the old fast acting stomach poisons widely used prior to the discovery of the 4-hydroxycoumarin and indandione anticoagulant rodenticides.

Figure 2:
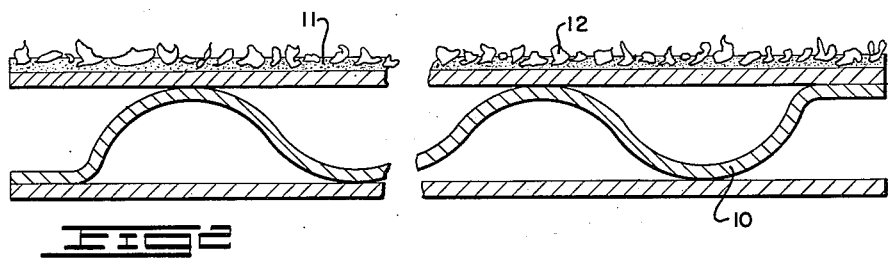

As illustrated in the drawing:
FIGURE 1 is an isometric view of the rodenticide product of the present invention; and
FIGURE 2 is a cross-section of the rodenticide product taken along line 2—2 of FIGURE 1.

In the drawing, 10 represents the carrier, backing or board, 11 represents the glue, and 12 represents the grain. The backing which is stiff or thick enough to be self-supporting, can be made of various materials and in various shapes, but is preferably made of absorbent fibrous material such as paper card or corrugated board or soft boxwood, as these materials readily retain or anchor the glue and also can be readily gnawed or chewed by mice. This latter characteristic appeals to the gnawing and destructive habits of the mouse. By diverting mice from sacks, cartons and the like, this important characteristic serves to substantially reduce goods damage while the infestation is being eliminated.

The glue should be edible and can be any water-soluble or water-dispersible edible animal glue or vegetable glue or mixtures of the same. Illustrative examples are animal glue made from animal skins and bones, fish glue, and casein glue, and vegetable glue such as gum acacia or gum tragacanth, starch dextrins, etc. The glue, in addition to affixing the grain to the board, also actively cooperates in making the bait even more attractive to the mouse owing to the fact that animal glues are rich in the sweet-tasting amino acid glycine and its polypeptides, and vegetable glues, including the dextrins, are inherently sweet owing to their sugar-like oligosaccharide composition. In addition to this "taste" factor, which is critical in the present invention, the natural animal and vegetable glues are non-tacky on drying.

The grain can be whole grain such as corn, wheat, rye, rice, barley malt, oat groats, peanut hearts or the like, singly or in admixture, fragments of these grains, or pellets made from meals of these grains. Good quality grain should be used.

In a preferred preparation of the product, separate aqueous solutions of the edible glue and the warfarin sodium are first prepared. For the preparation of warfarin sodium solutions see Link Patents 2,777,859 and 2,783,177. A portion of the warfarin sodium solution is added to the glue solution and the remaining portion of the warfarin sodium solution is sprayed on the grain. See Link Patent 2,687,365, supra. The glue solution containing warfarin sodium is then applied to or coated on the board, and the grain coated with warfarin sodium is then evenly applied to or distributed on the freshly applied glue where it sticks and becomes affixed when the glue dries. Warfarin, or a like-acting anticoagulant, finely powdered and homogeneously dispersed in the glue, can also be used in place of warfarin sodium in solution form. Warfarin, or a like-acting anticoagulant, can also be applied to the grain as well as be used in grain pellets, by incorporating the powdered anticoagulant in the grain meal prior to pelleting. Also, as noted above, the anticoagulant can be used in combination with the glue alone or in combination with the grain or grain pellets alone, in addition to use with both the glue and grain.

Various amounts of anticoagulant can be used in the products noted above with a range of about 0.01 to 0.2 percent by weight based on the edible products (glue and grain) being preferred. Investigations have shown, for example, that effective kills can be obtained with glue containing about 0.01 to 0.4 percent by weight of warfarin on a dry substance basis as well as with grain containing about 0.01–0.06 percent by weight of warfarin. Various amounts of glue can also be used but in all cases sufficient glue, e.g. a coat up to 1–2 mm. thick when dry, should be used to retain the grain on the board. Various amounts of grain can also be used although for most purposes it is desirable to evenly distribute sufficient grain on the glue so that it appears to be a uniform grain layer covering a large part or most of the glue. A second coating of glue, with or without anticoagulant, can also be applied over the grain to aid in the retention of the grain and improve the overall appearance of the finished product if desired.

The following examples will serve to illustrate the invention.

*Example I*

To a paper cardboard 2" wide and 24" long, freshly coated with a gum acacia mucilage (12 grams) containing 0.01 percent of warfarin as warfarin sodium (dry substance basis) prepared as described above, are added uniformly 28 gm. (1 ounce) of a mixture of cracked grains (⅓ yellow corn, ⅓ wheat, ⅓ oat groats), held by the 9 or 20 mesh (Tyler Scale) screen, and containing a warfarin content of 0.05 percent previously sprayed on the particles as warfarin sodium. After drying the cardboard is cut into six 2" x 4" pieces to provide six bait stations. The original 2" x 24" board contains about 14 mg. warfarin in the grain and about 0.3 mg. warfarin in the glue.

*Example II*

To a corrugated paperboard 2" wide and 24" long, freshly coated with a fish glue containing 0.01 percent warfarin sodium (dry substance basis) are added uniformly 28 gm. (1 ounce) of oat groats with a warfarin content of 0.05 percent previously sprayed on the groats as warfarin sodium. After drying the board is cut into six 2" x 4" pieces to provide six bait stations.

*Example III*

To a paper cardboard 2" wide and 24" long, freshly coated with a starch dextrin adhesive containing 0.01 percent of warfarin sodium (dry substance basis) are added uniformly 28 gm. (1 ounce) of cylindrical pellets, approximately groat size (e.g. approximately 2.5 mm. by 8 mm.), made from a meal consisting of ⅓ yellow corn, ⅓ wheat and ⅓ oat groats, having a warfarin content of 0.05 percent, either in the form of warfarin or warfarin sodium. After drying the board is cut into six 2" x 4" pieces to provide six bait stations.

*Example IV*

To a paper card or corrugated board 2" wide and 24" long, freshly coated with an animal glue made from skins or bones and containing 0.01 percent warfarin (dry substance basis) are added uniformly 28 gm. (1 ounce) of oat groats containing a warfarin content of 0.05 percent previously coated on the groats in the form of a warfarin concentrate containing 99.5 percent oat flour and 0.5 percent warfarin, either in the form of warfarin or warfarin sodium, and held on the groats with an oil binder, e.g. by spraying edible mineral oil. After drying the board is cut into six 2" x 4" pieces to provide six bait stations.

*Example V*

This example follows Example IV, except that gum arabic (14 grams) is used in place of the gelatine type animal glue used in Example IV and the glue on a wet basis contains about 0.1 percent warfarin as warfarin sodium. The 2" x 24" board contains 14 mg. of warfarin on the grain and about 14 mg. warfarin in the glue.

*Example VI*

This example follows Example I, except that the glue contains no warfarin and warfarin sodium is sprayed on the grain in an amount to provide about 0.06 percent warfarin by weight based on the grain.

*Example VII*

This example follows Example II, except that the grain contains no warfarin and warfarin sodium is dissolved in the glue in an amount to provide about 0.3 percent warfarin by weight based on the glue, dry basis.

*Example VIII*

This example follows Example III, except that no warfarin sodium is used in the glue and the warfarin added to the grain meal prior to pelleting is adequate to provide the pellets with about 0.07 percent by weight of warfarin.

*Example IX*

This example follows Example VII, except that the warfarin, in powder form, is added to the surface of the freshly applied glue just prior to the adding of the grain.

*Example X*

To a paper corrugated board 2" wide and 24" long, freshly coated with about 14 grams of edible animal glue (about 70% water) are added uniformly 28 gm. of a mixture of cracked grains made up of about equal proportions of yellow corn and oat groats. Substantially immediately thereafter and before the glue is completely dry, a dilute aqueous solution (10%) of warfarin sodium is then sprayed on the glue-grain surface, to provide a final product containing about 16 mg. of warfarin, i.e. about 0.05 percent warfarin by weight based on the weight of the edible products (glue and grain) on a dry substance basis.

*Example XI*

This example follows the general procedures of the preceding examples except that an indanedione anticoagulant is used in place of the 4-hydroxycoumarin anticoagulant. In this example, as the indanediones, such as Pival, form aqueous solutions with alkali metals with low orders of stability, it is preferred to use the anticoagulant in powder form either dispersed in the glue, affixed to the grain, or both and in the same concentrations noted above.

Extensive and repeated tests have shown the lethal anti-mouse boards of the present invention are extremely effective for destroying and controlling mice under a wide variety of conditions. For example, the basic attractiveness of the lethal anti-mouse boards has been repeatedly demonstrated in the "grain room" used to store sacked grain and other foodstuffs in the Department of Biochemistry at the University of Wisconsin. While this room is "mouse-proofed," i.e. sealed from the entry of mice by its construction, it proved to be subject to heavy infestations of mice due to the mice brought into the room in the sacks of grain and foodstuffs stored there. When the anti-mouse boards of the present invention are placed on the floor, along the walls, between and on the sacks and cartons in this room, it has been repeatedly observed that the mice prefer the anti-mouse boards to the food contents of the room and that the use of the boards has kept the mouse population down to the point where sack damage and the like to stored foodstuffs was eliminated. In these and other tests it also has been repeatedly observed that the mice will eat the glue, as well as the grain anchored in the glue to the board. Also, by gnawing, they will destroy or partially destroy the backing or board and thus be diverted from damaging the sacks and cartons of food.

In use, the anti-mouse boards can be placed anywhere with the glue-grain side up or, if desired, be attached to the floor, e.g. by tacking, use of adhesive tapes or the like. The anti-mouse boards of the present invention have proved neat and clean in use and enable the manufacturer to supply the user "built-in" multiple bait stations in a practical, single, compact package.

It is claimed:

1. In the art of exterminating and controlling mice, an anti-mouse product, comprising essentially a backing provided with a layer of edible material consisting essentially of a layer of edible glue having edible grain anchored in said glue, said edible material containing an anticoagulant rodenticide in the range of about 0.01 to 0.2 percent by weight based on the total weight, dry basis, of said edible material.

2. The anti-mouse product of claim 1, where the backing is a self-supporting, absorbent, fibrous backing, the glue is animal glue and the anticoagulant is warfarin.

3. The anti-mouse product of claim 1, where the backing is a self-supporting, absorbent, fibrous backing, the glue is vegetable glue and the anticoagulant is warfarin.

References Cited in the file of this patent

UNITED STATES PATENTS

| | | |
|---|---|---|
| 1,019,543 | Smoot | Mar. 5, 1912 |
| 1,161,537 | See | Nov. 23, 1915 |
| 2,783,177 | Link | Feb. 26, 1957 |
| 2,813,058 | Smith | Nov. 12, 1957 |

FOREIGN PATENTS

| | | |
|---|---|---|
| 1,228,137 | France | Mar. 14, 1960 |
| 1,231,921 | France | Apr. 19, 1960 |